(12) United States Patent
Makarchuk et al.

(10) Patent No.: US 12,129,057 B2
(45) Date of Patent: Oct. 29, 2024

(54) UAV STRUCTURAL ELEMENTS QUICK RELEASE FASTENING SYSTEM

(71) Applicants: Maksym Makarchuk, Uman (UA);
Roman Franchuk, Shepetivka (UA);
Yevhen Sedochenko, Obukhiv (UA);
Yevhenii Doroshenko, Kyiv (UA);
Hryhorii Yehoshyn, Kyiv (UA);
Dmytro Vrachynskyi, Kyiv (UA)

(72) Inventors: Maksym Makarchuk, Uman (UA);
Roman Franchuk, Shepetivka (UA);
Yevhen Sedochenko, Obukhiv (UA);
Yevhenii Doroshenko, Kyiv (UA);
Hryhorii Yehoshyn, Kyiv (UA);
Dmytro Vrachynskyi, Kyiv (UA)

( * ) Notice: Subject to any disclaimer, the term of this patent is extended or adjusted under 35 U.S.C. 154(b) by 58 days.

(21) Appl. No.: 17/925,621

(22) PCT Filed: Mar. 25, 2021

(86) PCT No.: PCT/UA2021/000027
§ 371 (c)(1),
(2) Date: Nov. 16, 2022

(87) PCT Pub. No.: WO2021/236047
PCT Pub. Date: Nov. 25, 2021

(65) Prior Publication Data
US 2023/0166828 A1    Jun. 1, 2023

(30) Foreign Application Priority Data
May 22, 2020    (UA) .............................. u 2020 03090

(51) Int. Cl.
*B64U 20/70* (2023.01)
*B64U 10/25* (2023.01)
(Continued)

(52) U.S. Cl.
CPC ............. *B64U 20/70* (2023.01); *B64U 10/25* (2023.01); *B64U 20/40* (2023.01); *F16B 21/04* (2013.01); *B64U 20/80* (2023.01)

(58) Field of Classification Search
CPC ....... B64C 1/26; B64C 2211/00; B64U 20/50; B64U 20/70; B64U 20/80; B64U 30/12;
(Continued)

(56) References Cited

U.S. PATENT DOCUMENTS

| | | | | |
|---|---|---|---|---|
| 5,941,478 A | * | 8/1999 | Schmittle | B64C 3/385 244/131 |
| 7,699,261 B2 | * | 4/2010 | Colten | B64C 39/024 244/45 R |

(Continued)

FOREIGN PATENT DOCUMENTS

KR    2009356 B1 *    8/2019    ............... B64C 1/26

*Primary Examiner* — Benjamin P Lee
(74) *Attorney, Agent, or Firm* — Robert Brownstein

(57) ABSTRACT

The UAV structural elements' quick-release fastening system, which includes at least two tail booms coupling with a center wing section/fuselage of a UAV and a tail assembly by at least two quick-release coupling elements from the center wing's section side and at least two coupling elements from tail assembly's side, the UAV wiring elements. The docking chucks are used as the quick-release coupling elements. Coupling and fixing the tail booms with a tail assembly realized by the tail assembly docking chucks and a bayonet mount. Coupling and fixing the tail booms with a center wing section/fuselage of a UAV is realized by the center wing section docking chucks and the center wing section fixing pins or by the center wing section docking chucks and bayonet mount. The system is generally used in a UAV design with integral or dismountable tail assembly.

2 Claims, 5 Drawing Sheets

Figure 1:
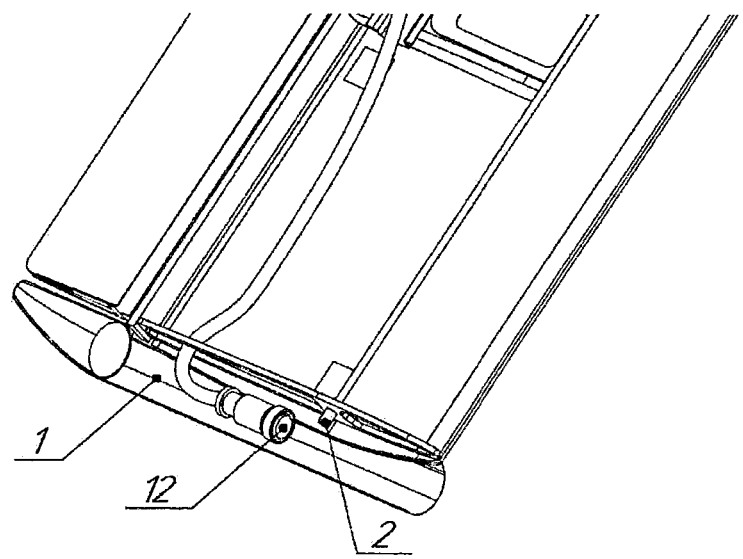

(51) Int. Cl.
*B64U 20/40* (2023.01)
*F16B 21/04* (2006.01)
*B64U 20/80* (2023.01)

(58) Field of Classification Search
CPC ......... B64U 30/40; B64U 10/25; F16B 21/02; F16B 21/04; B64F 5/10
See application file for complete search history.

(56) References Cited

U.S. PATENT DOCUMENTS

| | | | |
|---|---|---|---|
| 9,957,035 B2* | 5/2018 | Valasek | B64C 39/04 |
| 10,807,710 B2* | 10/2020 | Tian | B64C 1/30 |
| 10,870,479 B2* | 12/2020 | Courtin | B64U 20/40 |
| 11,292,596 B2* | 4/2022 | Grubb | B64U 30/12 |
| 11,447,246 B2* | 9/2022 | Kunz | B64U 30/40 |
| 11,554,847 B2* | 1/2023 | Stepura | B64U 10/25 |
| 2006/0091258 A1* | 5/2006 | Chiu | B64U 20/40 244/119 |
| 2008/0217486 A1* | 9/2008 | Colten | B64C 39/024 244/45 R |
| 2014/0312169 A1* | 10/2014 | Fisher | B64C 39/12 244/89 |
| 2016/0009363 A1* | 1/2016 | Valasek | B64C 1/22 244/13 |
| 2018/0086458 A1* | 3/2018 | Sartorius | B64U 20/50 |
| 2019/0168872 A1* | 6/2019 | Grubb | B64C 39/04 |
| 2019/0248469 A1* | 8/2019 | Hefner | B64C 39/024 |
| 2021/0197965 A1* | 7/2021 | Kunz | B64C 39/024 |
| 2021/0222809 A1* | 7/2021 | Chung | F16L 37/248 |

* cited by examiner

UAV STRUCTURAL ELEMENTS QUICK RELEASE FASTENING SYSTEM

The claimed utility model relates to the aviation industry, particularly to the systems for mechanical connection of modules and structural parts of unmanned aerial vehicles (in particular, coupling a tail assembly with a center wing section/fuselage of a UAV).

To ensure mobility and reduce dimensions of a UAV and unmanned aerial systems, in general, raises a need for modular UAV design with a quick release system for connecting modules, which would provide an ability to quickly disassemble/assemble airframe structural elements without additional tools for further transportation/storage in a transport packaging. Additionally, such a system should have sufficient toughness and reliability of the assembly, like an integral embodiment.

A classic screw connection is also widely applicable for the mechanical connection of a tail assembly with a center wing section/fuselage of a UAV. As known from the prior art, the «MUGIN 2600MM» UAV, which is embodied according to twin-boom aircraft configuration, has composite material tail booms which are fixed on a lower plane of a center wing section with inserts and four screws, then a tail assembly has related grooves for assembly with opposite ends of the tail booms and fixed with the screws (https://www.muginuav.com/wp-content/uploads/2019/08/Mugin-2600-BuildGuide.pdf).

One of the main disadvantages of this embodiment of mechanical connection is the complexity of disassembly/assembly of a UAV, the demand of tool using (at least screwdrivers), as well as the presence of small removable elements (screws, inserts), which may be lost during transportation or another operation.

Analogs of the claimed utility model also include an invention—«electrical connection structure, tail rod quick release structure and UAV having the same», which consists of the first wiring connection devices, the second wiring connection devices, a first connection element with thread that installed on the UAV fuselage, a second connection element with thread, which mounted on the tail boom of a UAV, first and second external tubes with thread, which embodiments a threaded joint between first and second structural elements of a tail boom and a fuselage, then fixing realize through spring-actuated casing tube with a thread (US patent No US 2018/0257778 A1).

The disadvantages of this invention are the large number of structural members, structure complexity, the necessity of structure elements connections manufacturing with metal or alloys, which make the weight increase of a coupling system, higher manufacturing accuracy requirements of individual system elements that makes production more complicated, comparatively increased complexity and preparation time for the start of a UAV with such coupling system.

The prototype of the claimed utility model is a quick release fastening system that used in "Penguin B" UAV design with a twin-boom tail assembly that joints to a center wing section with the docking chucks, which are consist of a pin attached to a center wing section and a horizontal stabilizer of a UAV and a crimp sleeve with holding screw which mounted at both ends of the tail booms and fixed on a pin due to the frictional force by tightening holding screws. Electrical wire bundles are placed inside the tail booms and equipped with the «male-female» type connectors, which mount inside the docking chucks (https://www.uvsr.org/docs/UAVFactory_Latvia_Penguin-B.pdf).

This embodiment of the quick-release fastening system partially simplifies assembly/disassembly of a UAV, however using additional tools as in case the first analogue is required, and vibrations of a UAV airframe which generated by the propulsion system bear the risk of fixing screws unbolting during operation, which results in uncoupling of the structural elements of a UAV.

The technical problem solved by the utility model consists in creating the structural elements quick release fastening system of a UAV, which provides a reliable connection of a center wing section/fuselage with a UAV tail assembly, does not require the additional tools for assembly/disassembly, provides fixing rigidity similar to integral coupling.

The technical result achieved by claimed utility model using consists of UAV structural elements quick release fastening system creation, which provides reliable connection of a center wing section/fuselage with the twin-boom tail assembly, no additional tools required, and provides quick assembly/disassembly in the field conditions, has sufficient fixation rigidity comparable to integral coupling.

The technical task is being solved, and the technical result is achieved by:
Using the docking chucks as a quick-release coupling;
realizing docking and fixation of the tail booms with a tail assembly by using the docking chucks of a tail assembly and a bayonet mount;
realizing docking and fixation of the tail booms with a center wing section/fuselage by using the docking chucks of a center wing section and the center wing section fixing pins or by using docking chucks of a center wing section and a bayonet mount;
possibility of using the quick-release fastening system on a UAV with a dismountable or integral tail assembly design.

Figure 2:
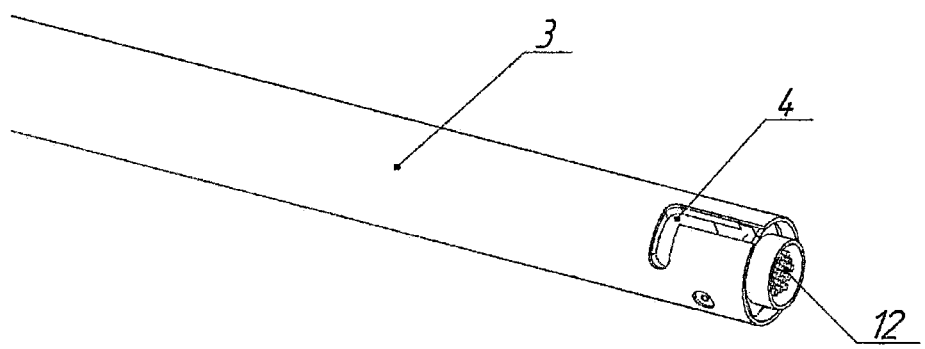
Figure 3:
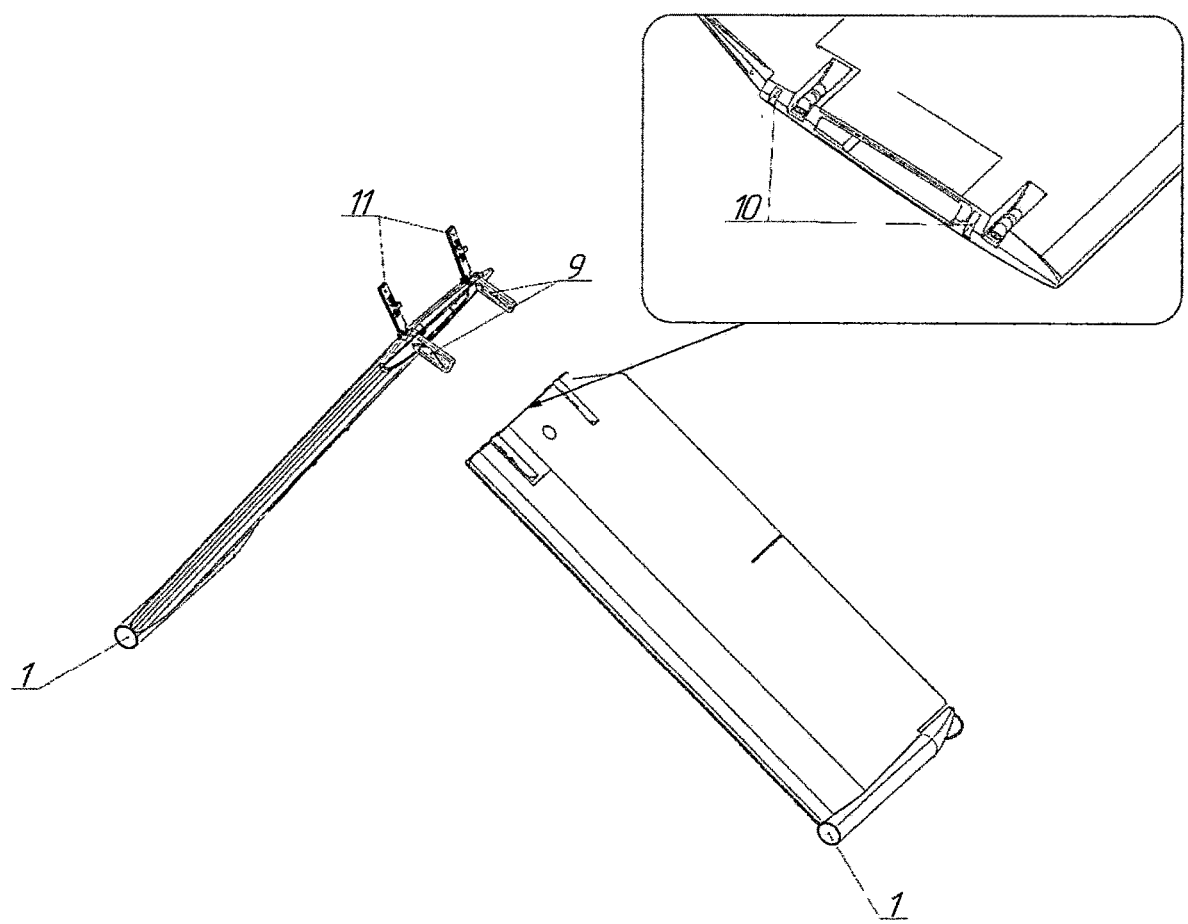
Figure 4:
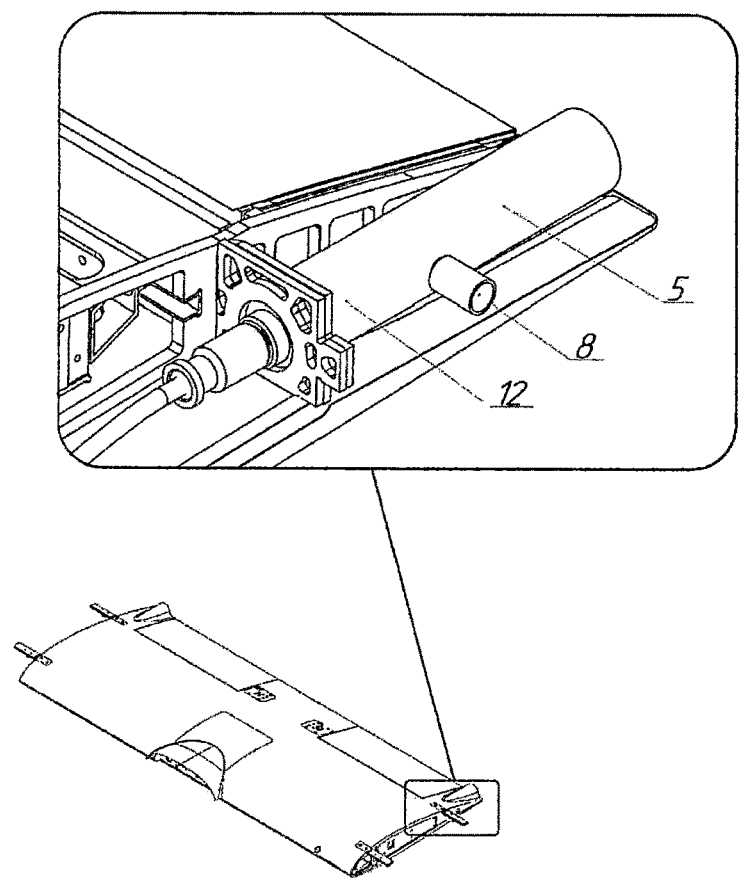
Figure 5:
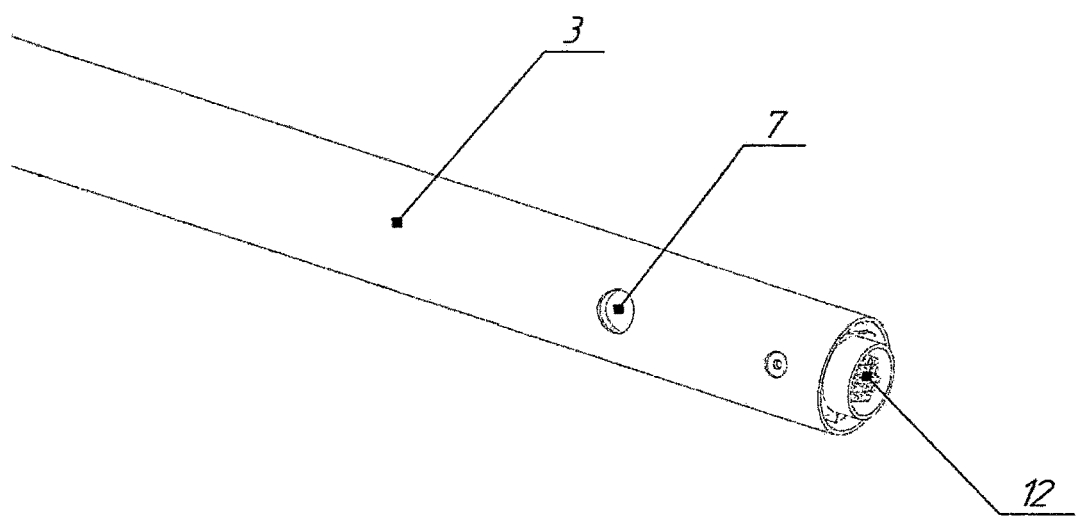
Figure 6:
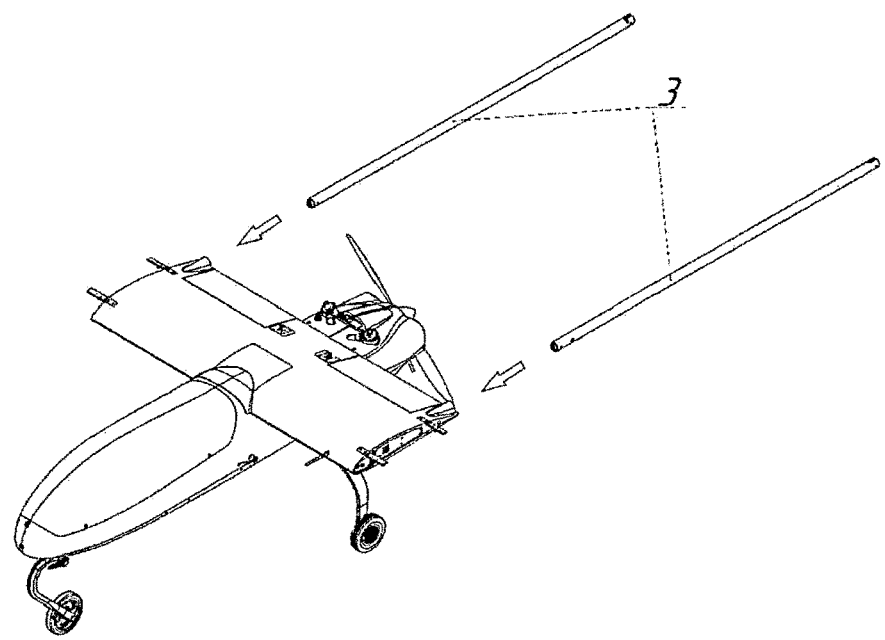
Figure 7:
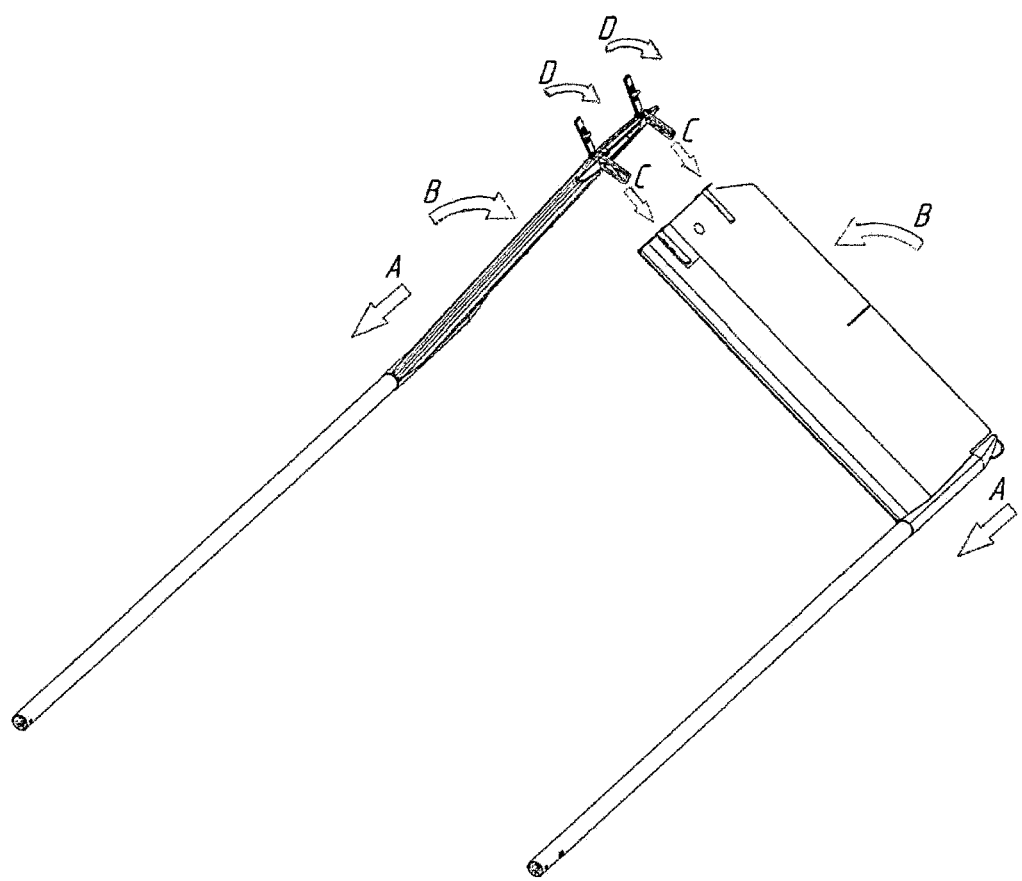
Figure 8:
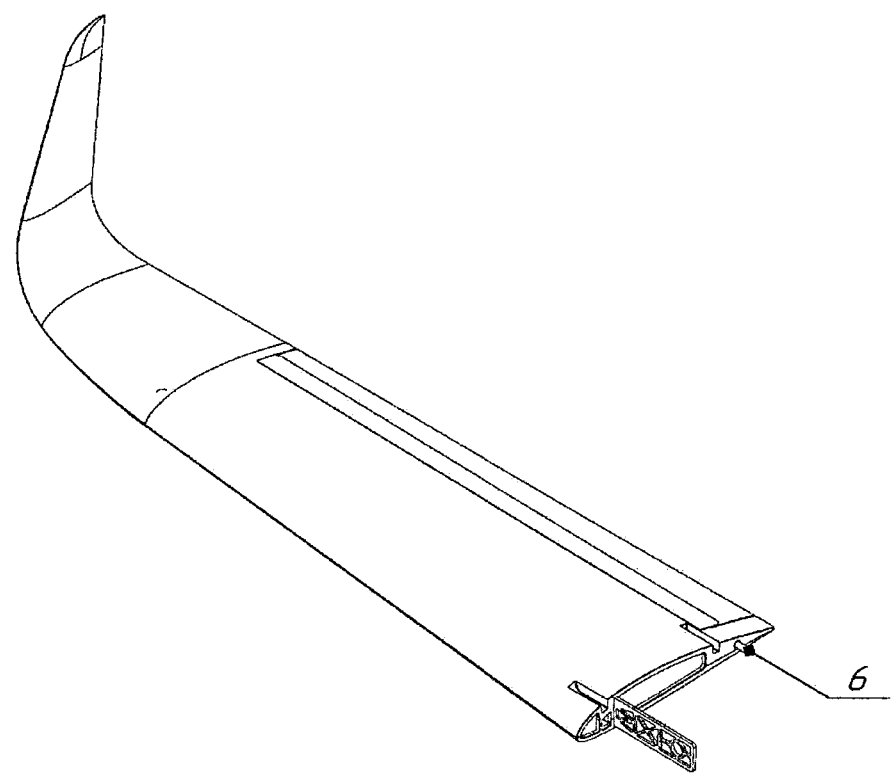
Figure 9:
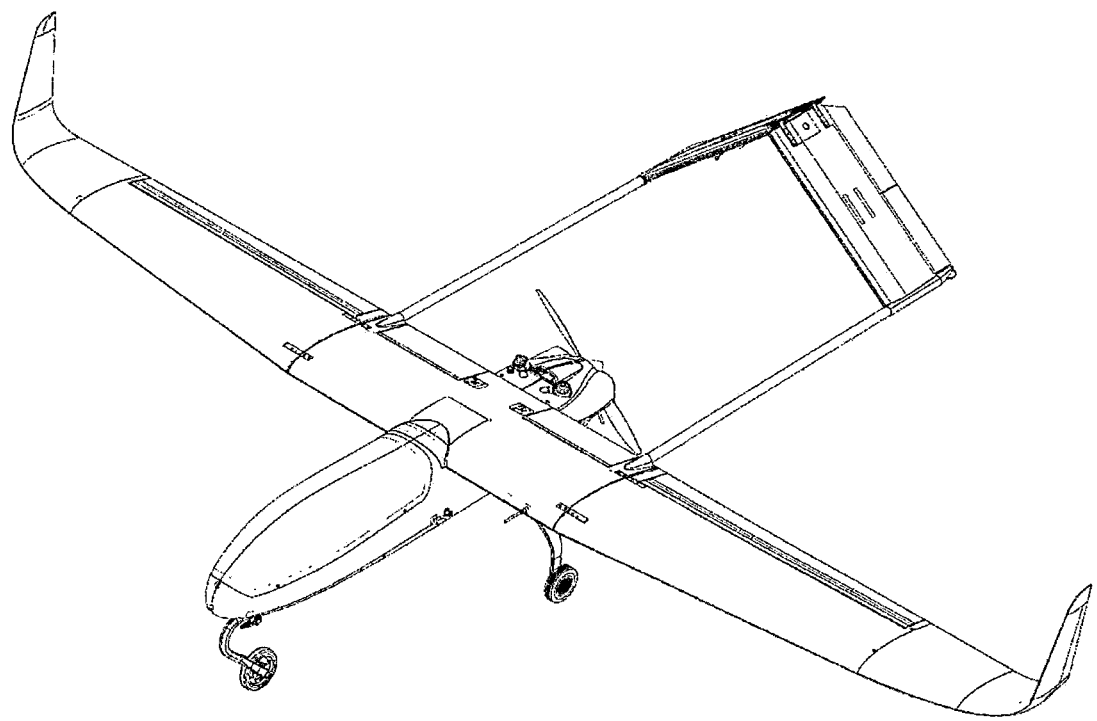

The essence of the utility model is shown on:

FIG. 1—a horizontal stabilizer half (without top casing) with a tail assembly docking chuck illustration;

FIG. 2—a tail boom (from the tail assembly's side) with an L-type cutout illustration;

FIG. 3—coupling method of the horizontal stabilizer halves;

FIG. 4—a UAV center wing section with installed center wing section docking chuck illustration;

FIG. 5—a tail boom with a UAV wiring bundle connector and the pin passing hole illustration (from the UAV center wing section's side);

FIG. 6—the tail booms with the center wing section docking chucks connecting method;

FIG. 7—the tail booms with the tail assembly docking chucks connecting method;

FIG. 8—a center wing section fixing pin mount example (according to the embodiment as a dismountable UAV's outer wings component);

FIG. 9—an example of a UAV with the structural elements quick release fastening system in assembled condition.

The UAV structural elements quick-release fastening system consists of at least two tail assembly docking chucks (1) mounted on the UAV horizontal stabilizer tips. The tail assembly docking chucks (1) are fitted out with the tail assembly locking pins (2) (at least one for each tail assembly docking chucks), that are mounted perpendicular to the axis of at least two tail booms (3), each has at least one L-shaped cutout (4) on the tail assembly side for tail assembly fixing pin (2) passing and the bayonet mount realizing between a UAV tail assembly and the tail booms (3) (from the side of a tail assembly). In another utility model embodiment, the tail booms (3) have at least one L-type cutout (4) both from the center wing section's and tail assembly's sides for center wing section fixing pins (6) and the tail assembly fixing pins (2) passing and the double-sided bayonet mount realization (both from center wing section's and UAV tail assembly's sides).

At least two center wing section docking chucks (5) are installed inside the body of a center wing section/fuselage fixedly and designed to connect the tail booms (3) with a center wing section or a UAV fuselage, have a hole for the center wing section fixing pins (6) passing, which (in one of the utility model embodiments) are dismountable part of the UAV outer wings or are separate structural elements or mounted in the body of the center wing section docking chucks (5) fixedly, similarly with the tail assembly (assuming that a bayonet mount is used both from tail assembly's and center wing section's sides). For fixing the fastening, the tail booms (3) have the tail booms holes (7) from the docking side with a center wing section/fuselage of a UAV (at least one hole to each of the center wing section docking chucks), which are concentric to the center wing section docking chucks holes (8) (at least one hole for each of the center wing section docking chucks), for the center wing section fixing pins (6) passing.

In another utility model embodiment, the L-type cutouts (4) there are instead of the tail booms holes (7) from the center wing section's side for the realization of a bayonet mount with a center wing section fixing pin (6). A double-side bayonet mount in this embodiment is realized. Center wing section fixing pins/tail assembly fixing pins quantity relates to tail booms holes/tail booms L-type cutouts quantity from the corresponding side.

The claimed utility model can be applied with dismountable or integral tail assembly. In case when utility model has applied in a UAV with a dismountable tail assembly, the horizontal stabilizer halves quick-release joint is needful, and the docking plates (9) are also may be included in the system for this purpose and mounted on one of the horizontal stabilizer halves, coupling with the docking chucks (10) of a dismountable horizontal stabilizer and fixing by the quick release fasteners (11), which have a flat surface and mounted flush with a UAV horizontal stabilizer cover to prevent impact on aerodynamics. The external dimensions of the docking plates (9) correspond to the internal dimensions of the docking chucks (10) of a dismountable horizontal stabilizer. A dismountable horizontal stabilizer embodiment using provides a significant reduction in dimensions of a tail assembly in disassembled condition, quick assembly/disassembly and sufficient structural rigidity of a UAV tail assembly.

The electrical wire bundles are laid through the tail booms (3) and equipped with the «male-female» type connectors at the joint of the docking chucks (1,5) for wire installation through the tail booms (3). The UAV wiring bundles connectors (12) are mounted fixedly at the ends of the tail booms (3), mounted movably in the center wing section docking chucks (5), and mounted fixedly in the tail assembly docking chucks (1). Wire bundles have an extra length to simplify UAV's assembly/disassembly and prevent the breaking of the UAV wiring bundles connectors (12) in the case were tail booms are accidentally hanging down on their own weight.

According to the first embodiment of the quick-release fastening system, the L-type cutouts (4) of the tail booms (3) are mutually opposite to each other from the tail assembly's side for implementation of the opposite rotation bayonet mount of the tail booms with a tail assembly. Use an integral or dismountable horizontal stabilizer consisting of two halves installed and fixed on the tail booms (3) by opposite rotation to each other (FIG. 7) in this embodiment. Tail booms (3) are coupled with the center wing section docking chucks (5) from the UAV center wing section's or fuselage's side and fixed through by using the center wing section fixing pins (6) pass through the concentric center wing section docking chucks holes (8) and the tail booms holes (7). When the utility model is used on a UAV with a dismountable horizontal stabilizer, the system elements' assembling sequence is as follows:

1) connection of the UAV wiring bundles connectors (12) from the center wing section's side;
2) coupling the tail booms (3) with the center wing section docking chucks (5) (FIG. 6) and moving them in docking chucks (5) up to the stop;
3) coupling the outer wings with the dismountable fixing pins (6) or their mounting in concentric center wing section docking chucks holes (8) and tail booms holes (7) (in their embodiment as the separate structural elements);
4) connection of the UAV wiring bundles connectors (12) from the tail assembly's side;
5) coupling the tail booms (3) with the tail boom docking chucks (1) so the tail assembly locking pins (2) are coincident with L-type cutouts (4) of the tail booms (3) and moving them in docking chucks (1) up to the stop;
6) horizontal stabilizer halves rotation in their coupling direction (FIG. 7) for tail assembly bayonet mount lock;
7) horizontal stabilizer halves coupling and locking (FIG. 7).

When a UAV design with a dismountable horizontal stabilizer is used, the system elements' assembling sequence is as follows:

1) connection of the UAV wiring bundles connectors (12) from the center wing section's side;
2) coupling of the tail booms (3) with the center wing section docking chucks (5) (FIG. 6) and moving in docking chucks (5) up to the stop;
3) connection the UAV wiring bundles connectors (12) from the tail assembly's side;
4) coupling the tail booms (3) with the tail assembly docking chucks (1), so the tail assembly locking pins (2) are coincident with L-type cutouts (4) of the tail booms (3) and moving them in docking chucks (1) up to the stop;
5) rotation of the tail booms (3) to each other in the mutually opposite direction (depending on the direction of L-type cutouts (4)) till stop for tail assembly bayonet mount lock;
6) coupling the outer wings with the dismountable fixing pins (6) or their mounting in the concentric center wing section docking chucks holes (8) and the tail booms holes (7) (in their embodiment as separate structural elements).

According to the second system embodiment, L-type cutouts (4) of the tail booms (3) are fulfilled mutual unidirectional from the tail assembly's side for the tail booms (3) with a UAV tail assembly bayonet mount realization. It is possible to use in this case integral or dismountable horizontal stabilizer that consists of two halves installed and fixed on the tail booms (3) by use of unidirectional rotation. The tail booms (3) are coupled by center wing section docking chucks (5) from the side of a UAV center wing section/fuselage and fixed with the center wing section fixing pins (6) passed through the concentric holes of the center wing section docking chucks (5) and holes of the tail booms (3) from center wing section's side. When the utility model is used on a UAV with an integral horizontal stabilizer, the system elements' assembling sequence is as follows:
1) connection of the UAV wiring bundles connectors (12) from the center wing section's side;
2) coupling the tail booms (3) with the center wing section docking chucks (5) (FIG. 6) and moving them in docking chucks (5) up to the stop;
3) connection the UAV wiring bundles connectors (12) of the UAV wiring bundles from the tail assembly's side;
4) coupling the tail booms (3) with the tail boom docking chucks (1), so the tail assembly locking pins (2) are coincident with L-type cutouts (4) of the tail booms (3) and moving them in docking chucks (1) up to the stop;
5) rotation of the tail booms (3) in docking chucks (1,5) in one direction (depending of L-type cutouts (4) direction) till stop for tail assembly bayonet mount lock;
6) coupling the outer wings with the dismountable fixing pins (6) or their mounting in the concentric center wing section docking chucks holes (8) and the tail booms holes (7) (in their embodiment as separate structural elements).

System elements assembly sequence with a dismountable horizontal stabilizer is the same as a first system embodiment. The difference is only in the initial horizontal stabilizer halves' asymmetrical position before the bayonet mount lock and rotation (paragraph 5 of claimed utility model first embodiment assembly sequence implementation).

According to the system's third embodiment, the tail booms (3) L-type cutouts (4) are made mutually opposite from the center wing section's and tail assembly's sides for the realization of a UAV center wing section/fuselage with the tail booms (3) bayonet mount connection and the tail booms (3) with a tail assembly bayonet mount connection. In addition, the L-type cutouts (4) also perform oppositely to each other between the quick-release fastening system's sides, which means that each tail boom (3) has mutually opposite L-type cutout (4) at both ends according to this utility model embodiment, which makes possible to implement a double-sided bayonet mount with the UAV dismountable horizontal stabilizer protected from inadvertent uncoupling due to vibration of a UAV airframe due to bayonet mount from center wing section's side and bayonet mount from tail assembly's side have mutually opposite rotation for mutual fixation. According to this embodiment, the center wing section fixing pins (6) are mounted in the center wing section docking chucks (5) fixedly in a similar way to the tail assembly locking pins (2). The system elements assembly sequence is as follows:
1) connection the UAV wiring bundles connectors (12) from the center wing section's side;
2) coupling the tail booms (3) with the center wing section docking chucks (5) and moving them in docking chucks (5) up till the stop and rotation of the tail booms (3) in the mutually opposite direction up to the stop for locking of a center wing section bayonet mount;
3) connection the UAV wiring bundles connectors (12) from the tail assembly's side;
4) coupling the tail booms (3) with the tail assembly docking chucks (1), so the tail assembly locking pins (2) are coincident with the L-type cutouts (4) of the tail booms (3) and moving the tail booms (3) in the docking chucks (1) up to the stop;
5) rotation of the horizontal stabilizer halves in the direction of their coupling (FIG. 7) for locking a tail assembly bayonet mount.

Outlined claimed utility model embodiments should be considered as particular and possible variants of embodiments that provide the equal technical result described in the application materials.

According to but not limited to one of claimed utility model embodiments, the UAV structural elements quick release fastening system is used in the «PD-1» UAV design (FIG. 9), which is high-wing aircraft with A-type dismountable horizontal stabilizer. The system is used in the embodiment with opposite rotation bayonet mount from the tail assembly's side, fixing the tail booms from the center wing section's side realized using the center wing section fixing pins, which are integral parts of the dismountable UAV outer wings (FIG. 8). Two docking plates are used to coupling the horizontal stabilizer parts, which are coupling with the docking chucks (10) of the dismountable horizontal stabilizer and fixing this coupling by the quick release fasteners (11).

The invention claimed is:
1. An unmanned serial vehicle (UAV) comprising:
a tail assembly comprising:
 a tail assembly docking chuck; and
 a male part of a bayonet mount;
a fuselage and a wing, wherein at least one of the fuselage and the wing comprises:
 a center wing section docking chuck; and
 a center wing section fixing pin; and
at least two tail booms; wherein each of the at least two tail booms comprise:
 a female part of the bayonet mount configured to mate with the male part of the bayonet mount; and
an electrical wire bundle;
wherein the male part of the bayonet mount comprises a tail assembly fixing pin, wherein the female part of the bayonet mount comprises an L-shaped cutout; and
wherein the tail assembly further comprises a first UAV wiring bundles connector, wherein the at least one of the fuselage and the wing further comprises a second UAV wiring bundles connector, wherein the electrical wire bundle comprises a third UAV winging bundle connector configured to mate with each of the first UAV wiring bundles connector and the second UAV wiring bundles connector in order to provide electrical connection; and
wherein the tail assembly further comprises a horizontal stabilizer, wherein the horizontal stabilizer comprises two horizontal stabilizer halves, wherein each of the two horizontal stablilzer halves comprises a docking chuck, wherein the electrical wire bundle further comprises a docking plate, wherein the docking plate is configured to mate with the docking chuck;
wherein electrical wire bundle further comprises a quick release fastener.

2. An unmanned aerial vehicle (UAV) comprising:
a tail assembly comprising:
 a tail assembly docking chuck; and
 a male part of a bayonet mount;
a fuselage and a wing, wherein at least one of the fuselage and the wing comprises:
 a center wing section docking chuck comprising a center wing section docking chucks hole, wherein the center wing section fixing pin is configured to mate with the center wing section docking chucks hole; and at least two tail booms, wherein each of the at least two bail booms comprise:
  a female part of the bayonet mount configured to mate with the male part of the bayonet mount; and
an electrical wire bundle;
wherein the tail assembly further comprises a first UAV wiring bundles connector, wherein the at least one of the fuselage and the wing further comprises a second UAV wiring bundles connector, where the electrical wire bundle comprises a third UAV wiring bundle connector configured to mate with each of the first UAV wiring bundles connector and the second UAV wiring bundles connector in order to provide electrical connection,
wherein the tail assembly further comprises a horizontal stabilizer, wherein the horizontal stabilizer is a dismountable part of the tail assembly, wherein the horizontal stabilizer comprises two horizontal stabilizer halves, wherein each of the two horizontal stabilizer halves comprises a docking chuck, where the electrical wire bundle further comprises a docking plate, where the docking plate is configured to mate with the docking chuck; and
wherein electrical wire bundle further comprises a quick release fastener.

* * * * *